United States Patent
Scheibe

(10) Patent No.: US 9,863,543 B2
(45) Date of Patent: Jan. 9, 2018

(54) FLUIDIC CONTROL ELEMENT

(71) Applicant: Buerkert Werke GmbH, Ingelfingen (DE)

(72) Inventor: Ralf Scheibe, Kuenzelsau (DE)

(73) Assignee: Buerkert Werke GmbH, Ingelfingen (DE)

( * ) Notice: Subject to any disclaimer, the term of this patent is extended or adjusted under 35 U.S.C. 154(b) by 41 days.

(21) Appl. No.: 15/215,639

(22) Filed: Jul. 21, 2016

(65) Prior Publication Data
US 2017/0045153 A1 Feb. 16, 2017

(30) Foreign Application Priority Data

Aug. 10, 2015 (DE) .................. 10 2015 113 164

(51) Int. Cl.
| | |
|---|---|
| F16K 31/00 | (2006.01) |
| F16K 11/052 | (2006.01) |
| F16K 1/16 | (2006.01) |
| F16K 11/044 | (2006.01) |
| F16K 31/02 | (2006.01) |

(52) U.S. Cl.
CPC .............. *F16K 11/052* (2013.01); *F16K 1/16* (2013.01); *F16K 11/044* (2013.01); *F16K 31/006* (2013.01); *F16K 31/025* (2013.01); *Y10T 137/86847* (2015.04)

(58) Field of Classification Search
CPC .... F16K 11/052; F16K 31/025; F16K 11/044; F16K 31/006; F16K 31/005; F16K 1/16; Y10T 137/86847
USPC .......................... 137/625.44; 251/129.06, 298
See application file for complete search history.

(56) References Cited

U.S. PATENT DOCUMENTS

| | | | |
|---|---|---|---|
| 4,285,497 A | 8/1981 | Goettel | |
| 4,343,329 A | 8/1982 | Turansky et al. | |
| 4,535,810 A * | 8/1985 | Duder | F15B 13/0405 137/596.17 |
| 4,986,308 A | 1/1991 | Champseaux | |
| 6,173,744 B1 * | 1/2001 | Frisch | F16K 31/006 137/625.44 |
| 6,705,347 B2 * | 3/2004 | Itzhaky | F16K 31/006 137/625.44 |
| 7,017,883 B2 * | 3/2006 | Bayer | F16K 31/005 137/625.44 |

(Continued)

FOREIGN PATENT DOCUMENTS

| | | |
|---|---|---|
| DE | 19720849 A1 | 1/1998 |
| DE | 102012205999 A1 | 10/2012 |

(Continued)

OTHER PUBLICATIONS

German Search Report dated Apr. 25, 2016 from corresponding DE Application No. 10 2015 113 164.1 along with unofficial English translation, 14 pages.

*Primary Examiner* — John Bastianelli
(74) *Attorney, Agent, or Firm* — Dilworth IP LLC

(57) ABSTRACT

A fluidic control element comprising a housing in which a fluid space is formed makes provision that at least a first and a second flow channel open into said fluid space, at least one of the flow channels comprising a closable valve seat in the fluid space. A valve body which can be swiveled about an axle is able to be pivoted in the fluid space toward the valve seat. A drive system in the form of an electroactive polymer actuator is provided.

16 Claims, 6 Drawing Sheets

(56) References Cited

U.S. PATENT DOCUMENTS

| | | | |
|---|---|---|---|
| 2005/0199845 A1* | 9/2005 | Jones ................... | F16K 15/031 251/129.06 |
| 2010/0117015 A1* | 5/2010 | Schaible ............... | F16K 31/006 251/129.06 |
| 2012/0161045 A1* | 6/2012 | Lee ....................... | F16K 31/006 251/129.01 |
| 2012/0264028 A1 | 10/2012 | Skala | |

FOREIGN PATENT DOCUMENTS

| | | |
|---|---|---|
| DE | 102012215548 A1 | 3/2014 |
| DE | 102013020312 A1 | 6/2015 |

* cited by examiner

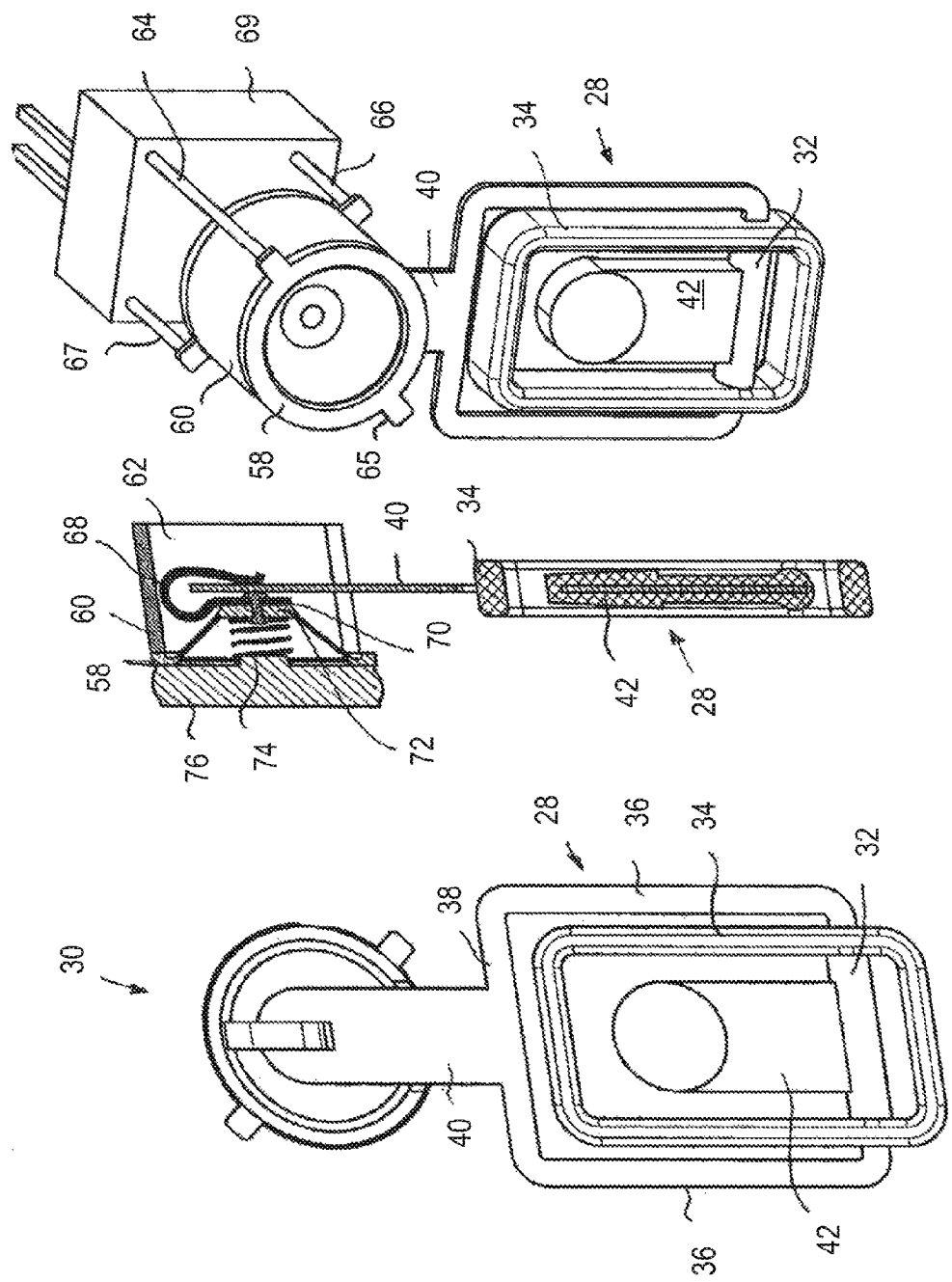

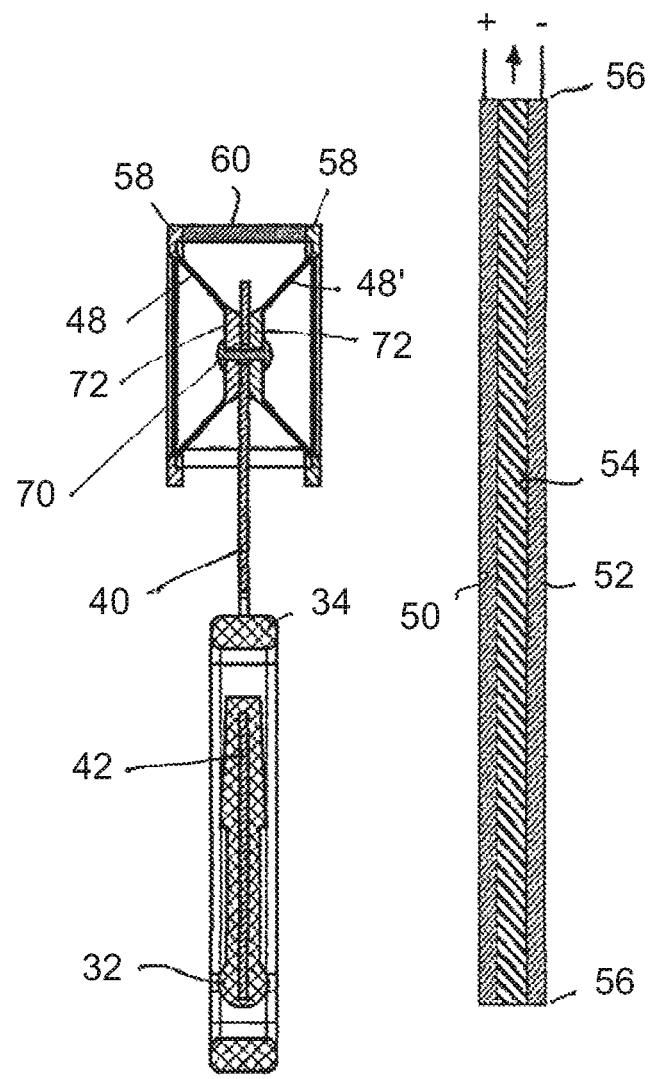

FLUIDIC CONTROL ELEMENT

FIELD OF THE INVENTION

The invention relates to a fluidic control element.

BACKGROUND OF THE INVENTION

Such fluidic control elements, i.e. valves, are subdivided in several areas, but the valve body extends into the fluid space, whereas the drive system is situated outside the fluid space. In prior art, electromagnetic actuators comprising coils are normally used to swivel the valve body.

However, it has turned out to be disadvantageous that the actuator absorbs power also in the stationary state, which is why the energy intake of the known fluidic control elements is relatively high in general. Further, such coils are suitable as an actuator only if they are not used in the area of strong magnetic fields.

It is therefore the object of the invention to provide a control element which has a compact design, is distinguished by a low energy intake, but nevertheless has very short switching times.

SUMMARY OF THE INVENTION

The present invention provides a fluidic control element comprising a housing in which a fluid space is formed, with at least a first and a second flow channel opening into said fluid space, at least one of the flow channels comprising a closable valve seat in the fluid space, a valve body in the fluid space being able to be pivoted in the fluid space toward the valve seat about an axle in order to close the associated flow channel, and a drive system for pivoting the valve body being provided outside the fluid space. The drive system is an electroactive polymer actuator. An electroactive polymer actuator comprises two flexible, large-area electrodes between which an essentially incompressible, flat polymer layer, for instance an incompressible elastomer, is arranged. Hence, such actuators are thin, flat elements preferably having an even planar basic shape. A voltage can be applied across the two flexible electrodes, whereby an electric field is built up between the two electrodes, so that they attract each other. The incompressible polymer arranged therebetween expands perpendicular to the field direction of the electric field established between the two electrodes. This is due to the fact that the volume of the polymer has to remain unchanged because of its incompressibility. As a reaction to the compression in the one direction, the polymer expands in the direction perpendicular thereto. The travel of the polymers between its original state and its compressed state is used for shifting the valve element to correspondingly switch over the valve body.

Depending on the design of the control element and the number of the flow channels opening into the fluid space, a resulting fluidic control element may be a 2/2-way valve or a 3/2-way valve or even a 3/3- or 5/3-way valve. Only a very small amount of energy is required for shifting the valve body, as the electroactive polymer actuator is very energy-efficient and does not take any power in the stationary state (apart from the compensation of stray currents) and is realized in analogy to a capacitor. The polymer actuator does not need any ferromagnetic parts, so that the control element according to the invention can be used in strong magnetic fields.

Preferably, the polymer actuator is firmly coupled to the valve body in both opposite swivel directions, in particular is directly connected to it, for instance by means of a positive-locking fit. This achieves a direct transmission of motion as well.

For the purpose of a simpler and stable fastening, an essentially dimensionally stable support part may be mounted to the polymer actuator at a distance from its edge, said support part being fastened to the valve body. The support part is supposed to transfer the load onto the polymer actuator, which indeed is extremely thin and hence labile, to a larger surface area.

In order to protect the polymer actuator, in particular the external electrodes, the support part may be fastened to the valve body by means of a clamp connection or a permanent rivet connection.

An easy replacement and assembly of the polymer actuator is made possible in that the support part comprises a clamping spring which surrounds the valve body at the periphery thereof. This clamping spring is detachably mounted to the valve body, on the one hand, so that it is only required to put it on or into the clamping spring, and on the other hand is fastened to the support part. Thus, the clamping spring preferably has a U- or Ω-shaped design.

The support part may be situated in the center of the polymer actuator, i.e. in the middle of the surface of the polymer actuator, so as to be loaded upon as uniformly as possible during the change of shape of the polymer actuator as soon as voltage is applied.

The polymer actuator may be situated in a drive chamber of the control element, the valve body extending from the fluid space into said drive chamber. Preferably, the drive chamber is fluidically separated from the fluid space, in particular by a sealing ring through which the valve body extends in the area of the swivel axle. This sealing ring may be designed such that the valve body is embedded in the sealing ring and represents a pre-assembled unit with the sealing ring. By way of example, the valve body is made of metal and is insert molded, with the sealing ring being produced in said insert molding process. Alternatively, the sealing ring may be applied by vulcanizing. The sealing ring surrounds the fluid space and seals off two housing parts which define the fluid space between them to the surroundings.

The fluidic control element has an especially compact design if the valve body comprises a first arm which protrudes from the axle, is situated exclusively in the fluid space and can be pivoted toward the valve seat, as well as at least one second arm which protrudes from the axle, is situated exclusively outside the fluid space and has the polymer actuator coupled to it. In this way, only the axle itself has to pass through the sealing, and the drive chamber has to be fluidically separated from the fluid space in the axle's area. Due to the polymer actuator being located outside the fluid space, only the inertial mass of a liquid in the fluid space hinders the movement of the valve body and a quick switching process.

The first and the second arm extend preferably in the same direction and may extend parallel to each other.

The polymer actuator can have its edge fastened to the wall of the drive chamber and freely projects between its fastening points into the interior of the drive chamber where it is coupled to the valve body. This design provides for a good lever arm and a large deflection of the valve body, which can be achieved by the polymer actuator. In previous polymer actuators, it was only the thickness alteration of the elastomer layer in a direction perpendicular to the layer which was used for achieving a deflection. For achieving larger deflections, several polymer actuators were superimposed in layers. It goes without saying that this is more expensive than the use of only one "layer", i.e. only one polymer actuator. However, by the polymer actuator extending according to the invention from the wall obliquely toward the linkage point or even perpendicular to the linkage point on the valve body, it is not merely the thickness alteration which is used for deflecting the valve body, but the even larger width or length variation of the elastomer layer when voltage is applied.

When applying a voltage, the polymer actuator and hence the attachment point on the polymer actuator moves further away from the fastening edge into the interior of the drive chamber than without applying a voltage. This can be compared with a membrane which is clamped at an open side of a cube and is acted upon with pressure from outside, so that it bulges out further into the interior of the cube with increasing pressure.

Compared with this example, however, it has to be emphasized that it is not required that the polymer actuator has its edge fastened to the wall in circumferential fashion, but that two opposite edge portions are sufficient to fasten it, so that it extends in an arched shape between its ends when applying a voltage.

According to one embodiment of the invention, a first and at least a second polymer actuator are arranged in the drive chamber. These polymer actuators may each be aimed for switching in one direction or may complement each other at least during a movement of the valve body. In particular, one polymer actuator is arranged on one side of the valve body and the other polymer actuator is arranged on the opposite side of the valve body and firmly coupled to it in each case. The polymer actuators may be mutually acted upon with a voltage, i.e. if one polymer actuator expands, the other contracts.

It is also possible to provide one or more spring elements preloading the valve body in one swivel direction. When applying a voltage, the polymer actuator becomes softer and longer. In this situation, the spring element stretches the polymer actuator which acts like a tether for the spring element. This results in a defined shape and deflection of the unit made up of spring element and polymer actuator. This means that a fixed position of the valve body is ensured when a voltage is applied.

Said spring element may be arranged between the wall of the drive chamber and the polymer actuator in the drive chamber in such a manner that it stretches the polymer actuator, in particular toward the interior of the drive chamber.

In order to be able to exactly adjust the control element according to the invention, in fact with respect to the position of the valve body, an adjustment device may be provided by means of which at least an end position of the valve body can be adjusted, preferably in infinitely variable fashion.

In this connection, one solution consists in providing an adjustable wall as an adjustment device, in particular a wall of the drive chamber. This wall is shifted toward the opposite wall to a greater or lesser extent, so that the position of the polymer actuator and hence also the position of the valve body is altered along with the shifting of the wall. Preferably, the adjustable wall is the wall to which the polymer actuator is attached.

A further option is to accommodate the polymer actuator in a unit which can be shifted in the housing. In particular, this unit is coupled to the adjustment device on one side and is elastically biased on the opposite side. Hence, a sort of guide or guide chamber is formed in the housing, in which the unit is inserted and can be adjusted lengthways to it. In order to create a simple mechanic system which is free of play, the unit is shifted from one side, for instance by means of a set screw, so that the unit is permanently pressed against the spring at the other side of the unit.

The polymer actuator may be in particular a strip-type actuator comprising at least one layer, so that the movement of the valve body is brought about by the elongation in the longitudinal direction of the strip.

BRIEF DESCRIPTION OF THE DRAWINGS

FIG. 3 shows a front view of the assembly of drive system and valve body used in FIG. 1, FIG. 4 shows a cross-sectional view through the unit according to FIG. 3, FIG. 5 shows a perspective view of the unit according to FIG. 3, FIG. 10 shows the assembly of drive system and valve which is used in the embodiments according to FIGS. 6 to 9, FIG. 11 shows a schematic sectional view through a polymer actuator used in the invention.

DETAILED DESCRIPTION OF THE INVENTION

Figure 1:
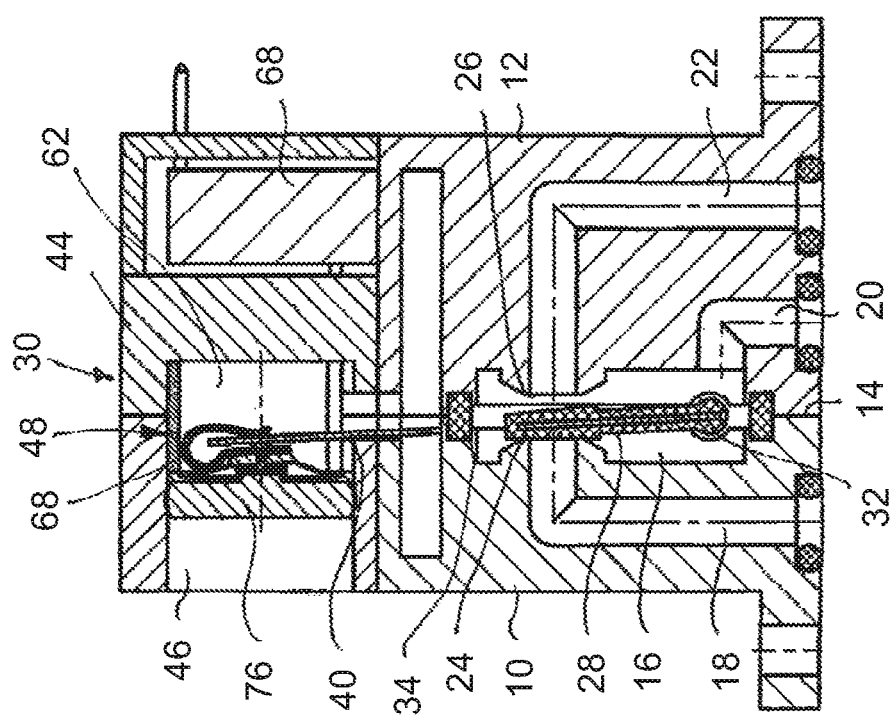
FIG. 1 shows a cross-sectional view through a first embodiment of the control element according to the invention if the polymer actuator is not actuated.

FIG. 1 illustrates a fluidic control element in the form of a valve comprising a multi-part housing having a first housing part 10 and a second housing part 12 fastened thereto.

The two housing parts 10, 12 adjoin each other preferably directly at associated end faces 14. A fluid space 16 is formed in the region of the end faces 14 in the interior of the housing and is defined by recesses in both housing parts 10, 12. However, it is also possible to realize a recess in only one of the housing parts 10, 12.

In the present case which is not to be understood in a limiting sense, three flow channels 18, 20 and 22 open into the fluid space 16, with the mouths of the flow channels 18, 22 being opposite each other in the fluid space 16 and being defined by valve seats 24, 26 which can be selectively closed by a pivotable valve body 28.

Figure 2:
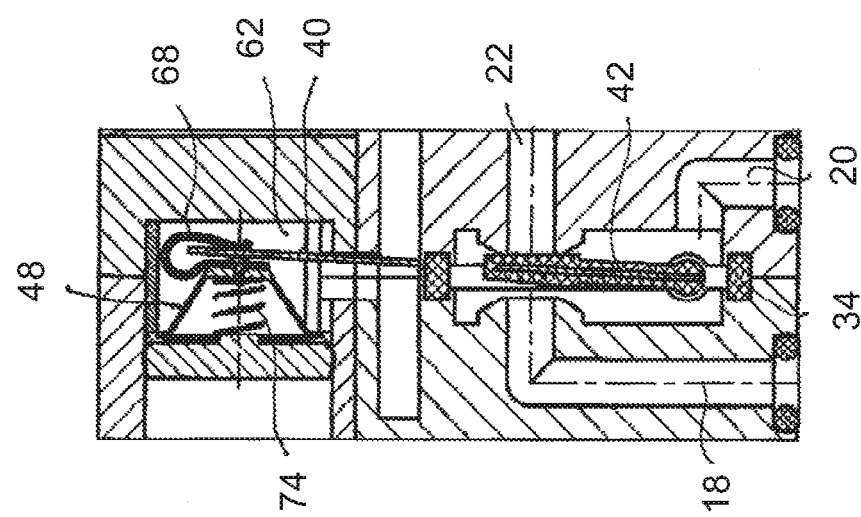
FIG. 2 shows a partial view of the control element according to FIG. 1 if the polymer actuator is actuated.

In FIG. 1, the flow channel 18 is closed, and in FIG. 2, the flow channel 22 is closed after pivoting the valve body 28. The flow channel 20, however, is always open toward the fluid space 16 and may function as an inflow channel, for example, whereas the other flow channels 18, 22 may serve as outflow channels (or vice versa).

The valve body 28 is shown in more detail in FIGS. 3 to 5, in fact together with the drive system 30 for pivoting the valve body; together with the valve body 28, said drive system may represent a pre-assembled drive and valve body unit.

The valve body 28 has a rod-shaped axle 32 about which it can be swiveled. This axle 32 extends transversely across the fluid space 16, to be more precise extends through the wall delimiting the fluid space 16 in the area of the joint face of the housing parts 10, 12. In the area of the axle 32, the valve body 28 has a sealing ring 34 attached to it, which in the present case has a substantially rectangular design with rounded corners. This elastic sealing ring 34 can be applied onto the valve body 28 by injection-molding or by vulcanization. The sealing ring 34 is compressed between peripheral recesses in the first and second housing part 10, 12 and hence seals off the fluid space 16 toward the surrounding in the area of the end faces 14. In addition, the sealing ring 34 serves as a bearing for the axle 32 in the area where the axle 32 penetrates it.

The axle 32 extends laterally through the sealing ring 34. Originating from the lateral ends of the axle 32 which are shown in FIG. 3, two parallel second arms 36 extend either outside the housing or in a separate space within the housing, with the arms 36 continuing into a connecting leg 38 which may extend parallel to the axle 32. Originating from the connecting leg, a drive arm 40 extends to the drive system 30 and constitutes the linkage of the drive system 30 to the valve body 28.

Between the second arms 36, an arm (which is referred to as first arm 42 in the following) extends from the axle 32 further into in the interior of the fluid space 16 toward the valve seats 24, 26 between which it ends eventually. The first arm 42 extends preferably parallel to the second arms 36 and between them, which is not to be understood in a limiting sense.

The valve body 28 is a part which is put together of several materials and comprises a core (see FIG. 4) which in the area of the first arm 42 and in the area of the axle 32 within the fluid space 16 is surrounded by an elastomer, which is also applied onto the core by injection molding or vulcanizing. The core may consist of metal or reinforced plastic, for instance a plastic reinforced with carbon fibers.

Whereas the first arm 42 is situated completely within the fluid space 16 and is swiveled therein, the second arms 36 and the remainder of the valve body 28 extend outside the fluid space.

For the formation of a drive system housing 44, further housing parts are put on the housing parts 10, 12. Formed in the drive system housing 44 is a laterally accessible accommodation chamber 46 in which the drive system in the form of an electroactive polymer actuator 48 is inserted.

In the present case, the polymer actuator (see FIG. 11) is relatively thin, almost implemented like a foil, and specifically in the form of an elongated strip. The structure itself resembles a capacitor and comprises two essentially parallel, elastic and foil-type electrodes 50, 52 which can be connected to a voltage source and which receive an incompressible polymer layer 54 between them. The electrodes 50, 52 have a full-area contact with the upper and lower sides (in terms of surface area, the largest sides of the polymer layer) and cover them. The polymer actuator 48 is clamped at its transverse edges 56 (see FIG. 11), i.e. at its short sides which have a larger distance between each other than the longitudinal edges of the strip-type polymer actuator; said clamping is effected, for instance, by means of a contact ring 58 and a contact sleeve 60, with the contact sleeve 60 and the contact ring 58 delimiting a drive chamber 62 within the seating 46, in other words form a wall of the drive chamber 62.

The contact ring 58 rests against the electrode 50 and the contact sleeve 60 rests against the electrode 52. Respective electric lines 64, 66 to the contact ring 58 and to the contact sleeve 60 are illustrated in FIG. 5 and run to a controller 69 which is also housed in the drive system housing 44 (see FIG. 1).

The polymer actuator 48 is fastened in such a way that—upon a corresponding activation by applying a voltage—it bulges out towards inside into the drive chamber 62 (see FIG. 2). This is achieved in that the polymer layer 54 expands laterally and hence in longitudinal direction, by it becoming thinner due to the application of voltage. This elongation of the strip-type polymer actuator 48 results in a bulge, starting from an initial position shown in FIG. 1. In said initial position, the first arm 42 is pivoted towards the left and closes the flow channel 18.

The coupling of the polymer actuator 48 to the drive arm 40 is effected via several parts, i.e. a clamping spring 68 which has a U- or Ω-shaped design and clamps the drive arm 40 between its legs by the clamping spring 68 extending around the edge side of the drive arm 40. This connection is a detachable connection.

The clamping spring 68 is coupled to the polymer actuator 48 by means of a rivet connection 70 (see FIG. 4) in a form-fitting manner.

On the side of the polymer actuator 48 opposite the clamping spring 68, an essentially dimensionally stable support part 72 is attached, here in the form of a plate (see FIG. 4), so that the support part 72 and the clamping spring 68 clamp the polymer actuator 48 between them with the aid of the rivet connection 70. The support part 72 is in the center of the polymer actuator 48, related to the longitudinal extension and the transverse extension of the polymer actuator 48.

Optionally, a spring element 74 is further provided in the drive chamber 62 between the support part 72 and a partition wall 76 and strives to move the polymer actuator 48 to the bulged position shown in FIG. 2, i.e. it preloads the valve body 28 into a swivel direction. As can be seen in the Figures, the valve body 28 is directly connected to the polymer actuator 48 in a form-locking manner in both of its opposite swivel directions.

By applying a voltage, the drive arm 40 is pivoted to the position shown in FIG. 2 upon a bulging of the polymer actuator 48, in which position the first arm 42 presses against the valve seat 26. The spring element 74 predetermines the direction of the bulging, which is supposed to be the swiveling direction, and prevents the elongating polymer actuator 48 from merely sagging down by gravity when electric current is applied.

The control element also comprises an adjustment device which ensures that the valve body 28 has an optimum position between the valve seats 24, 26 for the switching processes; said adjustment device also provides for that the valve body does not have too strong a contact with the one valve seat and too weak a contact with the other, which would result in the valve body possibly being able to close only one valve seat. For the adjustment device, the partition wall 76 is used which can be pressed into the seating 46 at different depths, in fact together with the remainder of the drive system. For adjusting purposes, the polymer actuator 48 is supplied with an electric current, so that it is swiveled into the position shown in FIG. 2. Now, the partition wall 76 is so far shifted to the right (together with the remainder of the drive system, of course) until a contact between the first arm 42 and the valve seat 26 is achieved. In this position, the control element is in the adjusted state. The partition wall 76 may then be potted, for instance by filling the partial volume of the accommodation chamber 46, which is left to it in FIG. 1, with a potting compound. Alternative possibilities include to press the partition wall 76 into the wall defining the accommodation chamber 46 or to screw it in via threads.

As can be seen in FIGS. 3 to 5, the drive system is a prefabricated unit which can be coupled very easily to the valve body 28 via the clamping spring 68. Due to inserting said drive system into the drive system housing 44 at different depths, the adjustment is made possible eventually.

The embodiment illustrated in FIGS. 6 and 7 differs from the one according to the previous Figures only by few differences explained below, so that in this respect the same, already introduced reference numerals are used for the same parts or those with the same function and only the differences will be explained below.

Figure 7:
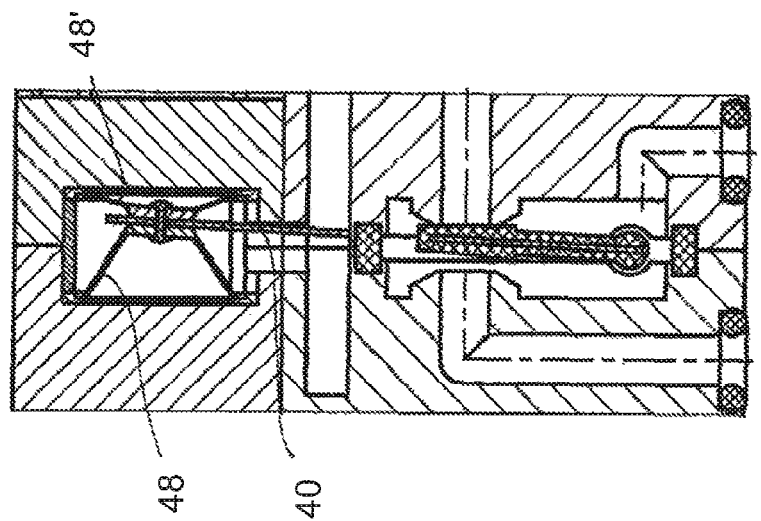
FIG. 7 shows a partial view of the control element according to FIG. 6 with the polymer actuator having been actuated oppositely.
Figure 6:
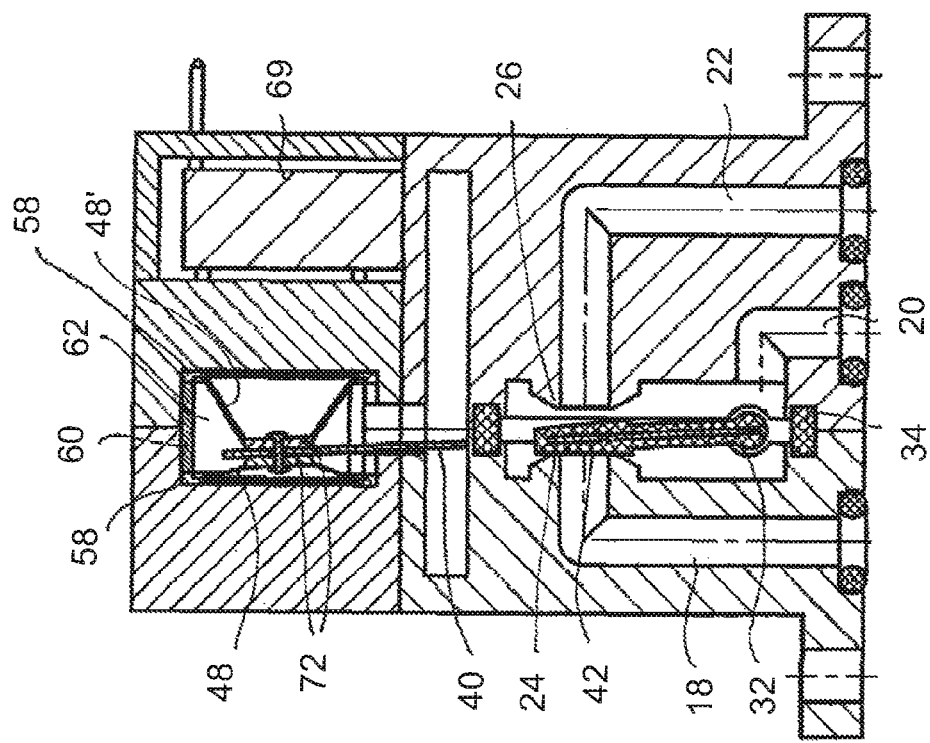
FIG. 6 shows a sectional view through a second embodiment of the control unit according to the invention.

In the embodiment according to FIGS. 6 and 7, polymer actuators 48, 48' are attached in a form-locking manner via a rivet connection 70 at the opposite sides of the drive arms 40, i.e. at both sides. Each of the polymer actuators 48, 48' is realized like the polymer actuator in FIGS. 3 to 5 and 11, i.e. the two polymer actuators 48 being identical. In this embodiment, no spring element 74 is provided.

The two polymer actuators 48, 48' are also illustrated in FIG. 10, showing the unit made up of the drive system 30 and the valve body 28 in separate presentation.

In the embodiment according to FIGS. 6 and 7, no adjustment device is provided. The drive chamber 62 is defined by the drive system housing 44 and the contact sleeve 60 as well as contact rings 58.

The contacting of the two polymer actuators 48, 48' is realized such that they are mutually operated and hence work against each other. This means that the one strip-type polymer actuator 48 has a short length if the other one has a larger length, so that it is possible to switch between the two end positions as shown in FIGS. 6 and 7.

Figure 9:
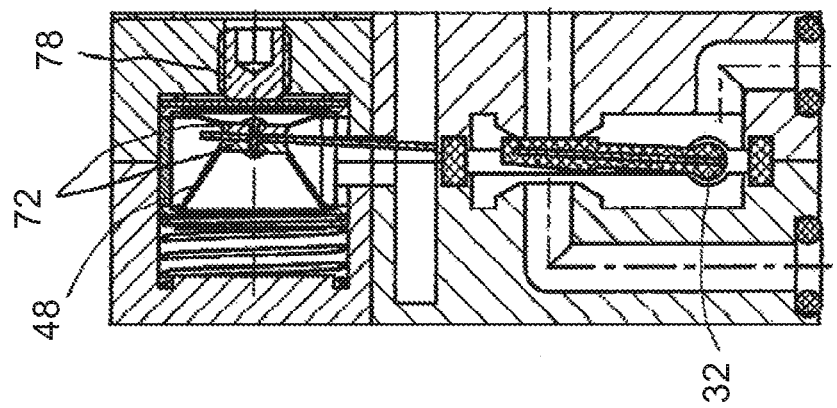
FIG. 9 shows a partial view of the control element according to FIG. 8 with the polymer actuator having been actuated oppositely.
Figure 8:
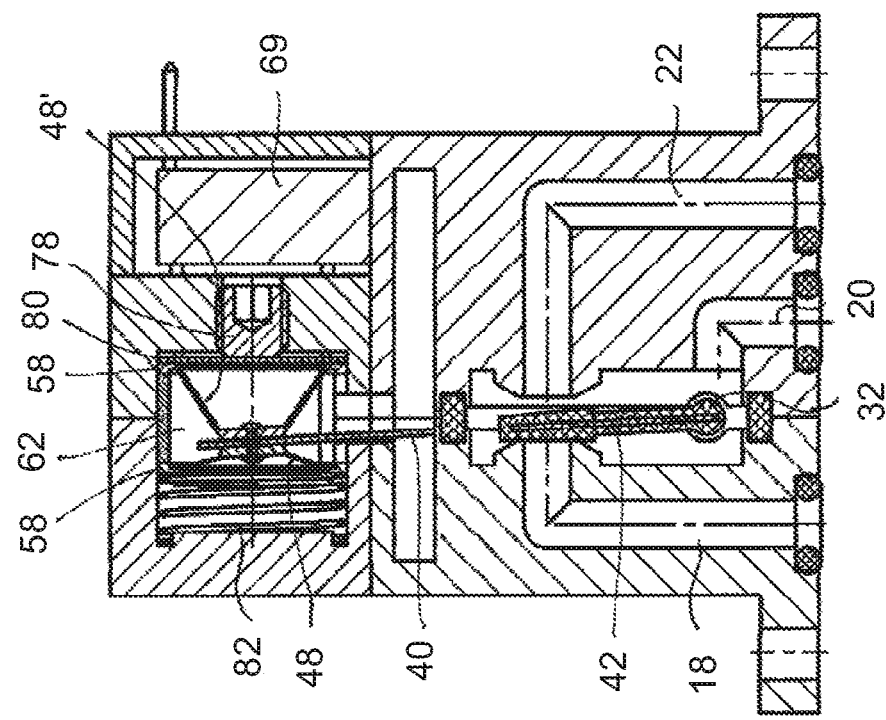
FIG. 8 shows a sectional view through a third embodiment of the control element according to the invention.

Also in the embodiment according to FIGS. 8 and 9, the respective unit made up of the drive system 30 and the valve body 28 corresponding to FIG. 10 is selected. However, an adjustment device is provided here. The space for the drive system 30 provided in the drive system housing 44 is longer in the operating direction of the drive system, so that the drive system, which can be seen in FIG. 10, can be shifted in the longitudinal direction. To this end, a threaded bolt 78 which can be screwed in to a greater or lesser extent is provided as a part of the adjustment device on an end wall and presses against a wall 80 which at its end face clamps the polymer actuator 48 or adjoins a contact ring 58. At the opposite side of the unit, a spring 82 is provided which preloads the unit toward the threaded bolt 78, so that there is no play of the unit within the drive system housing 44.

It goes without saying that it is not mandatory to provide only a one-layered actuator; it is also possible to provide several stacked polymer layers 54 which are spaced from each other by electrodes.

Figure 12:
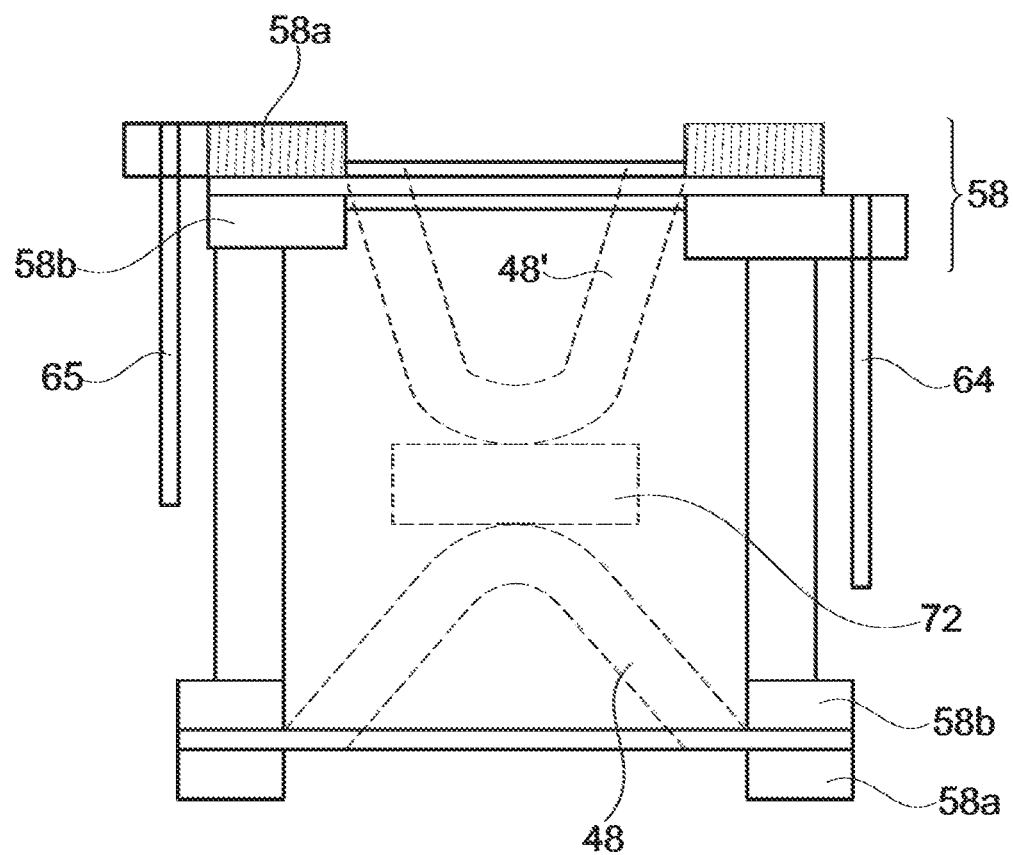
FIG. 12 shows a schematic, enlarged sectional view of an assembly group comprising two contact rings and two polymer foils.

Based on FIG. 12, a construction of the contact ring 58 will be described which is preferred in praxis and can be used for all embodiments described above.

The polymer foil is clamped in the contact ring 58; the contact ring can be considered as a frame which supports the polymer foil.

Here, the contact ring 58 consists of two parts 58a and 58b, with one of the contact ring parts (here the contact ring part 58a) resting against the electrode 50 and the other contact ring part (here the contact ring part 58b) resting against the other electrode 52.

With this construction of the contact ring 58, the ring 60 is a spacer in the embodiment of FIG. 10.

In the embodiments comprising two polymer foils, one polymer foil is clamped in one contact ring 58 and the second polymer foil is clamped in a second contact ring. Each of the contact rings 58 comprises two lines (see in FIG. 5 the lines 66, 67 for the "lower" contact ring (i.e. the one close to the controller) and the lines 64, 65 for the "upper" contact ring.

What is claimed:

1. A fluidic control element comprising a housing in which a fluid space is formed, with at least a first and a second flow channel opening into said fluid space, at least one of the flow channels comprising a closable valve seat in the fluid space a valve body being able to be pivoted in the fluid space toward the valve seat about an axle in order to close the associated flow channel, and a drive system for pivoting the valve body being provided outside the fluid space, wherein the drive system is an electroactive polymer actuator, wherein the polymer actuator is firmly coupled to the valve body in both opposite swivel directions, a support part, which is substantially dimensionally stable, is mounted to the polymer actuator at a distance from an edge of the polymer actuator and is fastened to the valve body, wherein the support part is fastened to the valve body by means of at least one of a clamp connection, rivet connection or adhesive connection, and a clamping spring, surrounding the valve body at the periphery thereof, is detachably mounted to the valve body and also fastened to the support part.

2. The fluidic control element according to claim 1, wherein the support part is situated in the center of the polymer actuator.

3. The fluidic control element according to claim 1, wherein a drive chamber is provided in which the polymer actuator is positioned, the valve body extending from the fluid space into said drive chamber.

4. The fluidic control element according to claim 3, wherein the fluid space is fluidically separated from the drive chamber.

5. The fluidic control element according to claim 4, wherein the fluid space is fluidically separated from the drive chamber by a sealing ring through which the valve body extends in the area of the axle.

6. The fluidic control element according to claim 4, wherein the valve body comprises a first arm which protrudes from the axle, is situated exclusively in the fluid space and can be pivoted toward the valve seat, as well as at least one second arm which protrudes from the axle, is situated exclusively outside the fluid space and has the polymer actuator coupled to it.

7. The fluidic control element according to claim 6, wherein the first and second arms extend from the axle in the same direction.

8. The fluidic control element according to claim 3, wherein the polymer actuator has its edge fastened to a wall of the drive chamber and projects between its fastening points into the interior of the drive chamber where it is coupled to the valve body.

9. The fluidic control element according to claim 8, wherein the polymer actuator, when applying a voltage, protrudes further into the interior of the drive chamber from its fastening edge than without applying a voltage.

10. The fluidic control element according to claim 8, wherein at least one second polymer actuator attached to the valve body is arranged in the drive chamber on the opposite side of the polymer actuator with respect to the valve body, and wherein the polymer actuators are applied with a voltage in opposite polarity.

11. The fluidic control element according to claim 1, wherein a spring element is provided, preloading the valve body in a swivel direction.

12. The fluidic control element according to claim 11, wherein the polymer actuator has its edge fastened to a wall of the drive chamber at more than one fastening points and projects between its fastening points into the interior of the drive chamber where it is coupled to the valve body and wherein the spring element is arranged between the wall of the drive chamber and the polymer actuator in the drive chamber in such a manner that it stretches the polymer actuator toward the interior of the drive chamber.

13. The fluidic control element according to claim 1, wherein an adjustment device is provided by means of which at least an end position of the valve body can be adjusted.

14. The fluidic control element according to claim 13, wherein the adjustment device is an adjustable wall of the drive chamber.

15. The fluidic control element according to claim 13, wherein the polymer actuator is accommodated in a unit which can be shifted in the housing, said unit being coupled to the adjustment device on one side and being elastically biased on the opposite side.

16. The fluidic control element according to claim 1, wherein the polymer actuator is a strip-type actuator comprising at least one layer.

* * * * *